United States Patent [19]

Johnson

[11] Patent Number: 5,002,353
[45] Date of Patent: Mar. 26, 1991

[54] APPARATUS AND METHOD FOR REDUCING MODULATOR NONLINEARITIES

[75] Inventor: Leonard M. Johnson, Carlisle, Mass.

[73] Assignee: Massachusetts Institute of Technology, Cambridge, Mass.

[21] Appl. No.: 343,039

[22] Filed: Apr. 25, 1989

[51] Int. Cl.$^5$ ............................ G02B 6/10; G02F 1/01
[52] U.S. Cl. .............................. 350/96.14; 350/96.12; 350/96.13
[58] Field of Search ............. 350/96.11, 96.12, 96.13, 350/96.14

[56] References Cited

U.S. PATENT DOCUMENTS

| | | | |
|---|---|---|---|
| 4,012,113 | 3/1977 | Kogelnik et al. | 350/96 |
| 4,127,320 | 11/1978 | Li | 350/96.13 |
| 4,291,939 | 9/1981 | Giallorenzi et al. | 350/96.14 |
| 4,340,272 | 7/1982 | Papuchon et al. | 350/96.14 |
| 4,691,984 | 9/1987 | Thaniyavarn | 350/96.14 |
| 4,711,515 | 12/1987 | Alferness | 350/96.14 |
| 4,752,120 | 6/1988 | Shimizu | 350/388 |
| 4,769,853 | 9/1988 | Goodwin et al. | 455/616 |
| 4,798,434 | 1/1989 | Dammann et al. | 350/96.11 |
| 4,820,009 | 4/1989 | Thaniyavarn | 350/96.13 |

OTHER PUBLICATIONS

Johnson et al., "Reduction of Intermodulation Distortion in Interferometric Optical Modulators", Optical Society Am. v.(13)(10), p. 928.
Betts et al, "High-Performance Optical Analog Link Using External Modulator", IEEE Photonics Tech. Letters, v(1) 11, p. 404.
B. H. Kolner and D. W. Dolfi, "Intermodulation Distortion and Compression in an Integrated Electrooptic Modulator", Applied Optics, 25, 3676-3680 (1987).
"External Amplitude Modulation Offers New Hope for RF Transmission", Lightwave, p. 6 (Feb. 1989).
P. R. Ashley and W. S. C. Chang, Digest of Topical Meeting on Integrated and Guided—Wave Optics, p. 36 (Optical Society of America, 1986).

Primary Examiner—John D. Lee
Assistant Examiner—Stephen W. Barns
Attorney, Agent, or Firm—Hamilton, Brook, Smith & Reynolds

[57] ABSTRACT

Non-linear distortion of a modulated light carrier wave arising from optical modulator nonlinearity of significantly reduced by offsetting a dominant cubic term of intermodulation distortion in transverse electric (TE) mode with a dominant cubic term of intermodulation distortion in transverse magnetic (TM) mode. The offset is achieved by adjusting the magnitude of the components of light in TE mode and TM mode to compensate for the differing response of components of the light wave in TM mode versus components in TE mode to a given voltage level applied to the carrier wave during modulation. The adjustments to the relative magnitude can be performed by a polarizer or polarization-preserving fiber. This method may be used in a modulating system and an electro-optical communication system.

16 Claims, 2 Drawing Sheets

APPARATUS AND METHOD FOR REDUCING MODULATOR NONLINEARITIES

GOVERNMENT SUPPORT

The research under which this invention was made was sponsored by the United States Air Force, Contract No. F19628-85-C-0002. As such the United States Government has certain rights regarding this invention.

BACKGROUND OF THE INVENTION

The present invention relates to the field of optical-fiber communication links and more particularly to a method of reducing the intermodulation distortion found to occur in link systems. Analog optical-fiber communication systems are being actively developed as substitutes for conventional electromagnetic transmission lines. One system that has proven especially attractive is to employ a constant power optical source, such as a laser diode, in conjunction with a wide bandwidth external modulator. Unfortunately, in this system, the dynamic range is limited by intermodulation distortion and harmonic distortion resulting from modulator nonlinearities. A need exists, therefore, for a method and apparatus that significantly reduces such modulator nonlinearities.

SUMMARY OF THE INVENTION

In accordance with one aspect of the present invention, a light source, preferably a laser diode, produces a light carrier wave. The light passes through a polarizer and is coupled to an external modulator.

Ideally, for analog modulation, the optical transmission of an external modulator varies linearly with drive voltage. Most modulators, however, have a nonlinear response. These nonlinearities lead to intermodulation and harmonic distortion.

The transmission of an interferometric modulator varies sinusoidally, as follows:

$$P_{out}(t) = \tfrac{1}{2} P_{in}[1 + \cos(\phi(t) + \theta)]$$

where $\phi(t)$ is proportional to $V_{in}(t)$ (modulating voltage) and where $\theta$ is a phase bias voltage applied to the modulator, and $P_{out}$ is the output power from the modulator. At the half-power point ($\theta = \pm\pi/2$), which corresponds to maximum modulator sensitivity, the optical power can be approximated as:

$$P_{out}(t) \approx \frac{P_{in}}{2} \phi(t) + \frac{P_{in}}{16} \phi(t)^3 + \text{higher order terms}.$$

The cubic term in this expression is the dominant component leading to third-order intermodulation distortion. This term also leads to third-harmonic distortion. At the half-power point, the even-order terms which lead to even harmonics, vanish.

The proportionality factor between $\phi(t)$ and $V_{in}(t)$ differs by a factor of $\gamma$ between the TE and TM polarization modes of the modulator, such that:

$$\frac{\phi_{TE}}{V_{in}} = \gamma \frac{\phi_{TM}}{V_{in}}.$$

This difference in sensitivity is exploited in the present invention to selectively cancel the cubic drive voltage dependence of the modulator and therefore greatly reduce the third-order intermodulation and third-harmonic distortion. This is achieved by coupling light into both the TE and TM propagating modes of the modulator and by adjusting the relative TE and TM power levels by the polarizer, and the DC voltage phase biases of the modulator, such that:

$$\gamma^3 P_{in}^{TE}\sin\theta_{TE} = -P_{in}^{TM}\sin\theta_{TM}.$$

With the above expression satisfied and with $\theta_{TE} = \pi/2$ and $\theta_{TM} = -\pi/2$, both the even-power terms and the cubic term vanish.

Thus, the modulating system of the present invention produces an output signal that is modulated but with minimal cubic intermodulation distortion.

BRIEF DESCRIPTION OF THE DRAWINGS

The foregoing and other objects, features and advantages of the invention will be apparent from the following more particular description of a preferred embodiment of the invention, as illustrated in the accompanying drawings.

DETAILED DESCRIPTION OF THE PREFERRED EMBODIMENT

Figure 1:
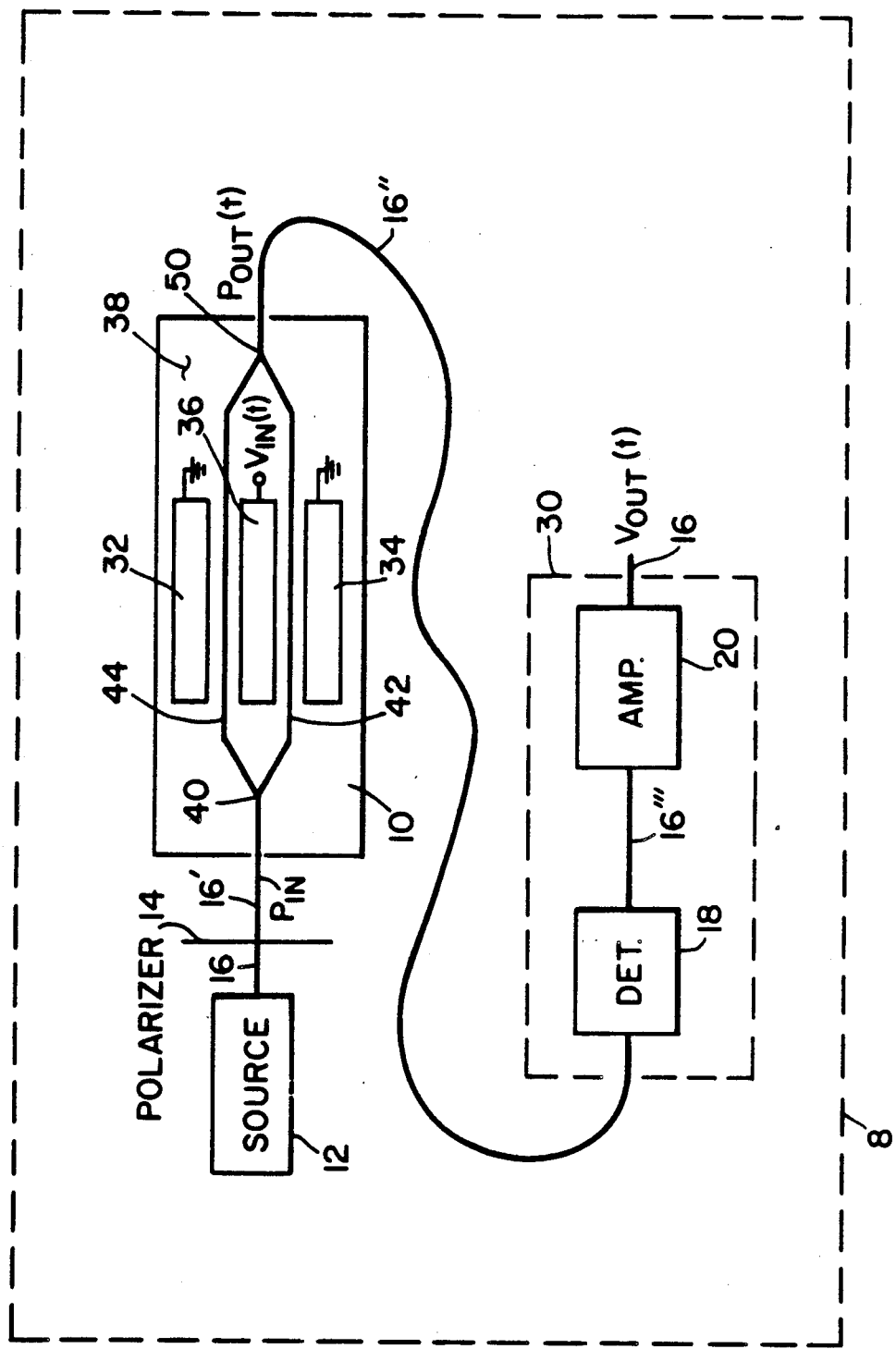
FIG. 1 is a block diagram of an optical system for reducing intermodulation distortion in accordance with the present invention.

A preferred embodiment of the electro-optical communication system of the invention will now be described in connection with FIG. 1. The system comprises, in general a continuous wave light source 12 for generating an optical carrier wave which is modulated to encode the light wave with information in modulator 10 in accordance with an electrical input modulator voltage signal $V_{in}(t)$. output of modulator 10 is an amplitude modulated (AM) optical carrier signal in which analog information is encoded in the amplitude modulations. Once modulated, the output signal can be transmitted over an optical fiber transmission line to a receiver 30 located at a remote location. Receiver 30, shown in superficial form, consists of a detector 18 for detecting or demodulating the amplitude modulations of the optical signal and converting them to a corresponding electrical signal which is optionally amplified in an amplifier 20. The modulator 10 is preferably a Mach-Zehnder interferometer, however, other similar modulators, such as directional couplers, may be employed and are intended to be encompassed within the present invention.

In the preferred embodiment, a laser light source 12, such as a laser diode, is used to produce a linearly polarized carrier light signal. The light produced by this light source 12 is coupled by optical fiber 16 to a polarizer 14. Polarizer 14 adjusts the relative power in the TE and TM polarization modes of modulator 10. An optical fiber 16 connects polarizer 14 to the modulator 10.

The modulator 10 preferably comprises an interferometric waveguide modulator consisting of Ti diffused waveguides 44 and 42 with strips of adjacent metal electrodes 32, 34 and 36 formed on a Lithium Niobate ($LiNbO_3$) substrate 38. Waveguides 44 and 42 are connected by branch 40 at the input and branch 50 at the output. The input optical carrier signal $P_{in}$ is divided at branch 40 into two equal carrier signals, one of which travels along waveguide 42 and the other of which travels along waveguide 44. A time varying voltage signal $V_{in}(t)$ applied across terminal 36 and grounded terminals 32 and 34 phase modulates the two carrier signals in the waveguides 42 and 44. The modulation is achieved by changing the index of refraction of the $LiNbO_3$ substrate to slow down or speed up the optical carrier signal in accordance with the modulations in drive voltage $V_{in}(t)$.

The two TE and TM optical signals are combined at branch 50 and interfere, resulting in amplitude modulation. They are then propagated from the modulator 10 via an optical fiber 16" to a receiver 30 for detection, or for demodulation, of the modulation produced by voltage signal $V_{in}(t)$. The receiver 30 consists of a photodetector 18 which converts the modulations into an electrical signal and an amplifier 20 for amplifying the electrical signal.

Polarization adjustments to the relative optical input power and adjustments to the phase biases of the TE polarization mode and of the TM polarization mode of the modulator result in a cancellation within the modulator 10 of the dominant cubic term of the modulator response which results in reduction of third order intermodulation distortion. The recombined signal detected by the photodetector 18 is substantially free of the dominant cubic term of the intermodulation and harmonic distortion making the fundamental frequency more readily detectable.

The detected signal passes through a wire to a voltage amplifier 20. The amplifier 20 boosts the voltage of the signal to produce the amplified output signal $V_{out}(t)$.

Thus far, the discussion of the present invention has focused on the operative steps and elements embodied in the present invention. However, to fully appreciate the present invention, it is useful to consider he underlying theory that is utilized by the invention. The starting point for such a discussion is a characterization of the light source 12.

The power of the analog carrier light signal produced by the light source 12 at the input to the modulator 10 is, as already noted, denoted as $P_{in}$. After the carrier light signal is modulated by the modulator 10, the optical power of the light signal is denoted as $P_{out}(t)$.

The transmission of an interferometric modulator varies sinusoidally, as follows:

$$P_{out}(t) = \frac{P_{in}}{2} [1 + \cos(\phi(t) + \theta)]$$

where $\phi(t)$ is proportional to $V_{in}(t)$ (modulating voltage) and where $\theta$ is a phase bias applied by the modulator, and $P_{out}$ is the output power from the modulator. At the half-power point ($\theta = \pm \pi/2$), which corresponds to maximum modulator sensitivity, the optical power can be approximated as:

$$P_{out}(t) \approx \frac{P_{in}}{2} \phi(t) + \frac{P_{in}}{16} \phi(t)^3 + \text{higher order terms}$$

The cubic term in this expression is the dominant component leading to third-order intermodulation distortion. This term also leads to third-harmonic distortion. At the half-power point, the even-order terms which lead to even harmonics, vanish.

In light of the proportionality of the time-varying phase modulation $\phi(t)$ to the drive voltage $V_{in}(t)$, the time-varying phase modulation $\phi(t)$ can, thus, be written as $\phi_m(\sin\omega_1 t + \sin\omega_2 t)$ where $\sin\omega_1 V_{in}t$ and $\sin\omega_2 V_{in}t$ are the two sinusoidal signals that constitute the modulating means drive voltage $V_{in}(t)$ in order to characterize intermodulation distortion.

These combined sinusoidal signals are applied to electrodes in the modulator 10.

Viewing $V_{in}(t)$ as comprised of two sinusoidal signals and remembering that the total output power equals the sum of the power of the polarization components of the output signal, $P_{out}(t)$ can also be written in a different form. In particular, $$P_{out}(t) = P_{0,0} + P_{1,0}(\sin\omega_1 t + \sin\omega_2 t) +$$
$$\sum_{k=2}^{\infty} P_{k,0}(\sin(k\omega_1 t) + \sin k\omega_2 t) +$$
$$\sum_{k=1}^{\infty} \sum_{j=1}^{\infty} P_{k,j}(\sin(k\omega_1 + j\omega_2)t) +$$
$$\sum_{k=1}^{\infty} \sum_{j=1}^{\infty} P_{k,j}(\sin(k\omega_1 - j\omega_2)t)$$

where
$P_{0,0}$ = amplitude coefficient for dc components;
$P_{1,0}$ = amplitude coefficients for the fundamentals;
$P_{k,0}$ = amplitude coefficients for the harmonics;
$P_{k,j}$ = amplitude coefficients for sum-frequency or difference-frequency components.

Unfortunately, when the output signal is modulated, intermodulation and harmonic distortion typically occurs because of the sinusoidal nature of the modulating means response. The contribution of distortion to the output signal is included in the above series equation. Specifically, the first summation term corresponds to harmonic distortion; the second summation term corresponds to sum-frequency intermodulation distortion; and the third summation term corresponds to difference-frequency intermodulation distortion. The other two terms of the series [i.e., the D.C. term $P_{0,0}$ and the fundamental term $P_{1,0}(\sin\omega_1 t + \sin\omega_2 t)$] correspond to the DC average power, and the power at the first harmonic of the two voltage drive signals, respectively.

The harmonic distortion and sum-frequency intermodulation distortion can be filtered out of the resulting output signal for systems that operate over less than an octave bandwidth. However, difference-frequency intermodulation distortion has proven to be more problematic. If the frequencies of the two voltage drive signals are nearly equal, then the dominant difference frequency intermodulation components (i.e., $2\omega_1 - \omega_2$ and $2\omega_2 - \omega_1$) are very close to the voltage drive signals (see FIG. 2). As such, these third-order intermodulation components cannot be readily filtered out of the output. The present invention provides an alternative means to filtering that significantly reduces this difference-frequency intermodulation distortion.

Referring again to the series equation for output power $P_{out}(t)$, the amplitude coefficients for the fundamentals can be estimated as $(-P_{in}/2)\phi_m \sin\theta$ + higher order terms, and the amplitude coefficients for the third-order intermodulation terms can be estimated as $(-P_{in}/16)(\phi_m)^3 \sin\theta$ + higher order terms. The higher order terms do not contribute significantly to the respective components. The $\phi_m$ component in the third-order intermodulation terms is cubed because there is a cubic dependency between the modulating means output power at third-order intermodulation frequencies and the drive voltage. In contrast, there is only a linear dependency between the modulating means output power at the fundamental frequencies and the drive voltage. These estimates assume $\phi_m$ is significantly less than one.

The total output power at any of the frequencies is equal to the sum of the respective TE and TM components at that frequency. It is, therefore, appropriate to view the approximation of output power just described as being equal to the sum of an approximation for the TE components and an approximation for the TM components. The fact that the estimation can be viewed as the sum of the respective TE and TM components is important in selecting a modulator, for modulating means are capable of having different sensitivities to the different polarization components. In fact, a modulator can produce different sensitivities to the TE and TM modes using the same drive voltage amplitude. In particular, the modulator sensitivities can be adjusted so that for a given voltage amplitude $V_m$:

$$\phi_m{}^{TE} = \gamma \phi_m{}^{TM}$$

where $\phi_m{}^{TE}$ = the amplitude of the time-varying phase modulation for the TE component;

$\phi_m{}^{TM}$ = the amplitude of the time-varying phase modulation for the TM component;

$\gamma$ = constant dictated by the modulating means.

In the present invention, this difference in sensitivity is exploited to selectively cancel the dominant cubic term of the intermodulation distortion. As mentioned previously, the cancellation is accomplished by adjusting the optical input power of the different input polarization components (i.e., $P_{in}{}^{TE}$ and $P_{in}{}^{TM}$) through rotation of the polarizer 14 and by adjusting the electrical phase biases of the input polarization components (i.e., $\theta^{TE}$ and $\theta^{TM}$) within the modulating means 10. These parameters are adjusted such that:

$$P_{in}{}^{TE}(\phi_m{}^{TE})^3 \sin\theta^{TE} = -P_{in}{}^{TM}(\phi_m{}^{TM})^3 \sin\theta^{TM}$$

which results in cancellation of the cubic voltage dependence of the modulator and a reduction of the dominant third-order intermodulation distortion component.

To maximize the cancellation, the constant phase biases are set at:

$$\theta_{TM} = -\pi/2$$

$$\theta_{TE} = \pi/2.$$

When the constant phase biases are set as such, the relationship of the dominant third-order intermodulation distortion components of the two polarization modes can be simplified to $$P_{in}{}^{TM} = \gamma^3 P_{in}{}^{TE}.$$

For a LiNbO$_3$ modulating means, $\gamma$ is typically approximately 3. Thus, the ratio of TM to TE power as established by polarizer 14 is set at 27 for third-order intermodulation distortion cancellation. The result of employing such a ratio of power levels is significant reduction of the dominant third-order intermodulation components with only the higher order component of distortion remaining. Results for $\gamma$ approximately equal to 3 are shown in FIG. 2

Figure 2:
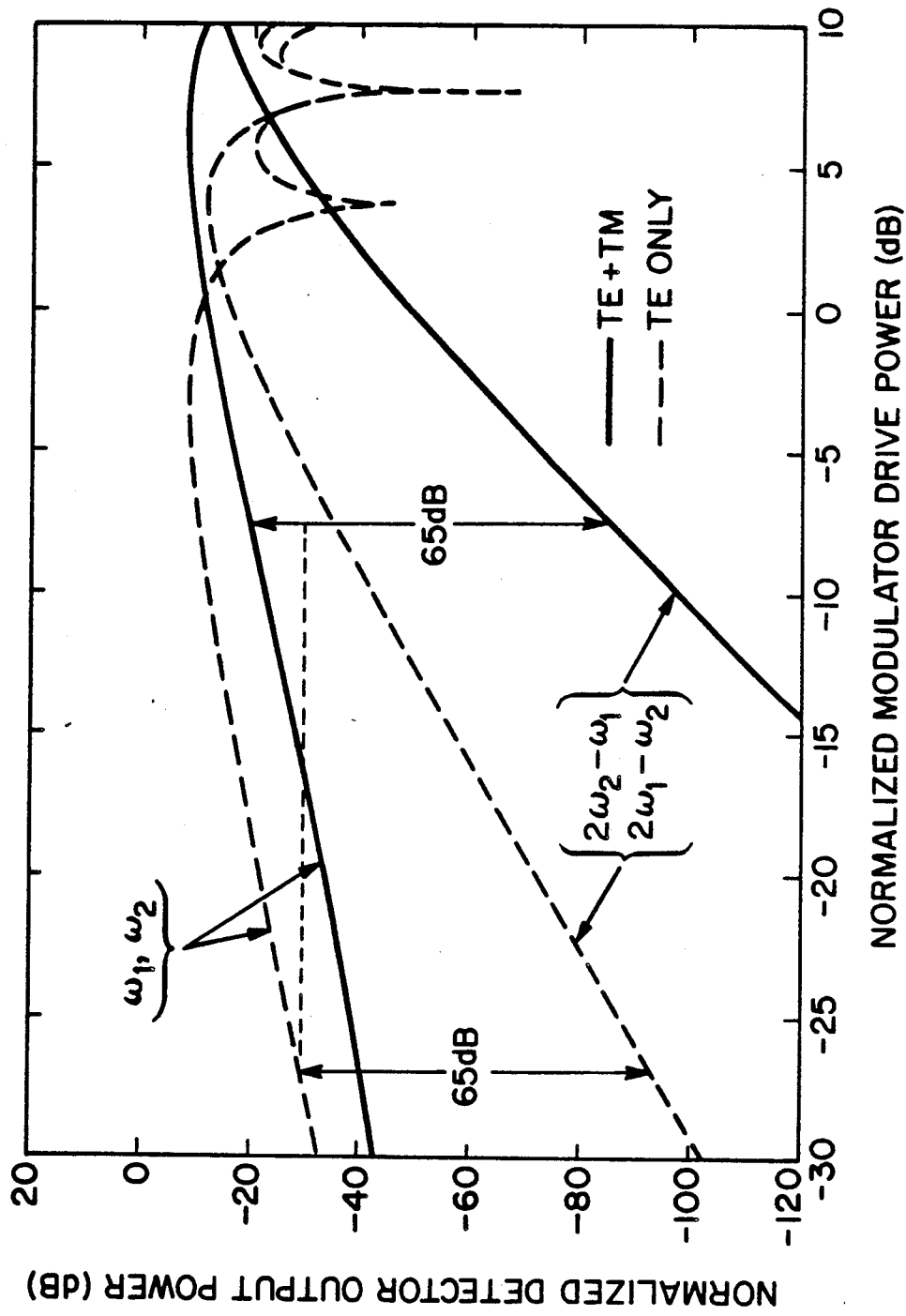
FIG. 2 is a graph of the fundamental frequencies and the dominant third-order intermodulation distortion frequencies as found when the present invention is employed.

FIG. 2 shows the effect of employing the dual polarization method encompassed by the present invention. In particular it shows a plot of the detector electrical output power level for the fundamental and third-order intermodulation product as a function of electrical drive power. The dashed lines indicate the single polarization results, and the solid lines indicate the optimized dual polarization results with $\gamma = 3,$ $\theta^{TE} = \pi/2$ and $\theta^{TM} = -\pi/2.$ As FIG. 2 indicates a significant reduction in intermodulation distortion can be achieved for a given depth of modulation at the fundamental frequency. As the depth of modulation decreases, the reduction in intermodulation distortion increases. With this bias condition, even harmonics also vanish. Further, if the intermodulation suppression is specified, the fundamental output power from the detector can be substantially increased. As FIG. 2 reveals, a −9dB increase in the fundamental output power can be obtained with the present invention if a 65−dB intermodulation suppression level is specified.

Note that in practice the polarizer 14 and filters 16 and 16' could be replaced by a polarizing optical fiber. Also, it is not necessary to couple the light wave to the polarizer and modulator by a fiber. A focused light beam may be used instead.

The present invention significantly increases the dynamic range that may be achieved in electro-optical communication systems. It is especially useful in systems that have stringent intermodulation suppression requirements and that are not limited by either available power or by intermodulation distortion of the electrical driver.

EQUIVALENTS

While the invention has been particularly shown and described with reference to preferred embodiments thereof, it will be understood by those skilled in the art that various changes in form and details may be made without departing from the spirit and scope of the invention as defined in appended claims.

I claim:

1. A method for reducing non-linear distortion in a modulation system comprising:
   a. providing a carrier wave from a radiation source having an amplitude and first and second polarization components;
   b. adjusting the magnitude of the first polarization component relative to the magnitude of the second polarization component; and
   c. modulating the amplitude of the carrier wave with an electrical signal such that the cubic nonlinearity of the first polarization component reduces the cubic nonlinearity of the second polarization component, thereby reducing non-linear distortion.

2. The method of claim 1 wherein the carrier wave is provided by a laser light source.

3. The method of claim 1 further comprising the step of detecting the modulated carrier wave.

4. The method of claim 1 wherein said adjusting step comprises rotating a polarizer means from a first position to a second position.

5. A method of reducing intermodulation distortion and harmonic distortion in a modulating system having a light source for generating a carrier wave, a polarizing means for polarizing the carrier wave, and a modulating means for modulating the amplitudes of the carrier wave with an electrical signal so as to encode information, comprising the steps of:

a. producing the carrier wave with the light source;

b. polarizing the carrier wave with the polarizing means to adjust the relative optical power of the carrier wave in the transverse electric (TE) polarization mode of the modulator versus the optical power of the carrier wave in the transverse magnetic (TM) polarization mode of the modulator to utilize the differing responses of the TE polarization mode components of the carrier wave and the TM polarization mode components of the carrier wave to the electrical signal, such that a dominant cubic term of modulator nonlinearity in the TE polarization mode is reduced by a dominant term of modulator nonlinearity in the TM polarization mode of the modulator after modulation, thereby reducing intermodulation and harmonic distortion;

c. modulating the amplitude of the polarized carrier wave with the electrical signal.

6. A method as recited in claim 5 further comprising the step of filtering out sum-frequency distortion resulting from modulation of the carrier wave.

7. The method as recited in claim 5 wherein said modulating means is comprised of a Mach-Zehnder interferometer.

8. A method of offsetting third-order non-linear distortion in a modulating system having a light source for producing a carrier wave, a polarizer for polarizing the carrier wave, and a modulator for modulating the amplitudes of the carrier wave with an electrical signal so as to encode information, comprising the steps of:

a. producing the carrier wave with the light source;

b. polarizing the carrier wave from the light source with the polarizer such that $$P_{IN}^{TM} = \gamma^3 P_{IN}^{TE}$$

where $P_{IN}^{TM}$ is optical power of the carrier wave in transverse magnetic (TM) polarization mode, $P_{IN}^{TM}$ is optical power of the carrier wave in transverse electric (TE) polarization mode, and $\gamma$ is a constant; and c. modulating the carrier wave such that $$\phi_M^{TE} = \gamma \phi_M^{TM}$$

where $\phi_M^{TE}$ is time-varying phase modulation of the carrier wave in the TE polarization mode, and $\phi_M^{TM}$ is time-varying phase modulation of the carrier wave in the TM polarization mode.

9. An opto-electric modulating system having reduced non-linear distortion comprising:

a. a light source for producing a carrier wave;

b. a polarizer for polarizing the carrier wave to adjust the power of the carrier wave in transverse electric (TE) polarization mode relative to the power of the carrier wave in transverse magnetic (TM) polarization mode;

c. a modulating means for applying an electrical signal that modulates the light that is polarized by the polarizer to encode information, wherein the modulation also results in adjustments to phase biases in the TE polarization mode and in the TM polarization mode; and wherein the adjustments to the relative optical power of the carrier wave in the TE polarization mode versus the optical power of the carrier wave in the TM polarization mode in combination with the adjustments by the modulating means to phase biases in the polarization modes offsets terms of non-linear distortion.

10. A modulating system as recited in claim 9 wherein the light source is a laser diode.

11. A modulating system as recited in claim 9 wherein the modulating means is an interferometric modulator.

12. A modulating system as recited in claim 11 wherein the modulating means is a Mach-Zehnder interferometer.

13. A modulating system as recited in claim 9 wherein the modulating system further comprises optical fiber for carrying the carrier wave from the light source to the modulating means.

14. A modulating system as recited in claim 9 further comprising:

a. a detector means for detecting the carrier wave modulated by the modulator means;

b. an optical fiber for carrying the carrier wave from the modulator means to the detector means.

15. An electro-optical communication system having reduced non-linear distortion comprising:

a. a light source for producing a carrier wave light signal;

b. a polarizer coupled to the light source for adjusting the relative optical power of the carrier wave in transverse electric (TE) polarization mode versus optical power of the carrier wave in transverse magnetic (TM) polarization mode;

c. a modulator connected to the polarizer via an optical fiber for encoding information into the carrier wave;

d. a remote receiver for receiving the encoded carrier wave;

wherein the modulator and polarizer manipulate the carrier wave such that the non-linear distortion in the TE polarization mode offsets the non-linear distortion in TM polarization mode.

16. An electro-optical communication as recited in claim 13, wherein the remote receiver comprises a detector for detecting the carrier wave after it is modulated and a voltage amplifier for boosting the voltage of the detected carrier wave.

* * * * *

UNITED STATES PATENT AND TRADEMARK OFFICE
CERTIFICATE OF CORRECTION

PATENT NO. : 5,002,353
DATED     : Mar. 26, 1991
INVENTOR(S) : Leonard M. Johnson It is certified that error appears in the above-identified patent and that said Letters Patent is hereby corrected as shown below:

Col. 8, line 57, delete "13" and insert ---15---.

Signed and Sealed this

Twenty-fifth Day of August, 1992

*Attest:*

DOUGLAS B. COMER

*Attesting Officer*    *Acting Commissioner of Patents and Trademarks*

UNITED STATES PATENT AND TRADEMARK OFFICE
CERTIFICATE OF CORRECTION

PATENT NO. : 5,002,353

DATED : March 26, 1991

INVENTOR(S) : Leonard M. Johnson

It is certified that error appears in the above-identified patent and that said Letters Patent is hereby corrected as shown below:

Col. 7, line 51, delete "$P_{IN}^{TM}$" and insert ---$P_{IN}^{TE}$---

Col. 8, line 1, replace opto-electric with opto-electronic

Signed and Sealed this

Twenty-second Day of September, 1992

*Attest:*

DOUGLAS B. COMER

*Attesting Officer*     *Acting Commissioner of Patents and Trademarks*